US010552471B1

United States Patent
Dandekar et al.

(10) Patent No.: US 10,552,471 B1
(45) Date of Patent: Feb. 4, 2020

(54) DETERMINING IDENTITIES OF MULTIPLE PEOPLE IN A DIGITAL IMAGE

(71) Applicant: Stripe, Inc., San Francisco, CA (US)

(72) Inventors: Pranav Dandekar, Palo Alto, CA (US); Ashish Goel, Stanford, CA (US); Peter Lofgren, Palo Alto, CA (US)

(73) Assignee: Stripe, Inc., San Francisco, CA (US)

( * ) Notice: Subject to any disclaimer, the term of this patent is extended or adjusted under 35 U.S.C. 154(b) by 154 days.

(21) Appl. No.: 15/494,397

(22) Filed: Apr. 21, 2017

(51) Int. Cl.
| G06F 17/30 | (2006.01) |
| G06F 16/56 | (2019.01) |
| G06K 9/00 | (2006.01) |
| G06F 16/583 | (2019.01) |
| G06F 16/2457 | (2019.01) |

(52) U.S. Cl.
CPC ........ *G06F 16/56* (2019.01); *G06F 16/24578* (2019.01); *G06F 16/5838* (2019.01); *G06K 9/00268* (2013.01); *G06K 9/00288* (2013.01)

(58) Field of Classification Search
CPC ..................................................... G06F 17/30
See application file for complete search history.

(56) References Cited

U.S. PATENT DOCUMENTS

| 2008/0199055 A1* | 8/2008 | Lee | G06K 9/00281 |
| | | | 382/118 |
| 2013/0077833 A1* | 3/2013 | Kritt | G06K 9/00288 |
| | | | 382/118 |
| 2013/0121540 A1* | 5/2013 | Garcia | G06K 9/00288 |
| | | | 382/118 |
| 2013/0262588 A1* | 10/2013 | Barak | H04L 67/22 |
| | | | 709/204 |

FOREIGN PATENT DOCUMENTS

WO    2015191741 A1    12/2015

OTHER PUBLICATIONS

Amos et al., "OpenFace: A general-purpose face recognition library with mobile applications", Jun. 2016, <URL:http://reports-archive.adm.cs.cmu.edu/anon/2016/CMU-CS-16-118.pdf/>, (20pgs).

(Continued)

*Primary Examiner* — Khanh B Pham
(74) *Attorney, Agent, or Firm* — North Weber & Baugh LLP

(57) ABSTRACT

Embodiments of the present disclosure include systems and methods for identifying people in an image that contains more than one face images. In embodiments, a query feature vector that represents features is extracted from each face image. In embodiments, each query feature vector is compared to image feature vectors in a database and a set of candidate vectors is selected among the image feature vectors. Then, a set of user accounts that is associated with the set of candidate vectors is selected. The strengths of connection in a network between user accounts in a set of candidate user accounts corresponding to a face image and user accounts in a different set of candidate user accounts corresponding to a different face image may be determined. In embodiments, user accounts that has the highest strength of connection are selected and used to identify the persons corresponding to the face images.

20 Claims, 12 Drawing Sheets

(56) References Cited

OTHER PUBLICATIONS

Schroff et al., "FaceNet: A Unified Embedding for Face Recognition and Clustering". Jun. 17, 2015, <URL:https://arxiv.org/pdf/1503.03832v3.pdf/>, (10 pgs).
Patrick, J., "How Facebook Knows What You Look Like", Jul. 9, 2015, <URL:http://time.com/3951006/facebook-visual-recognition/>, (2pgs).

\* cited by examiner

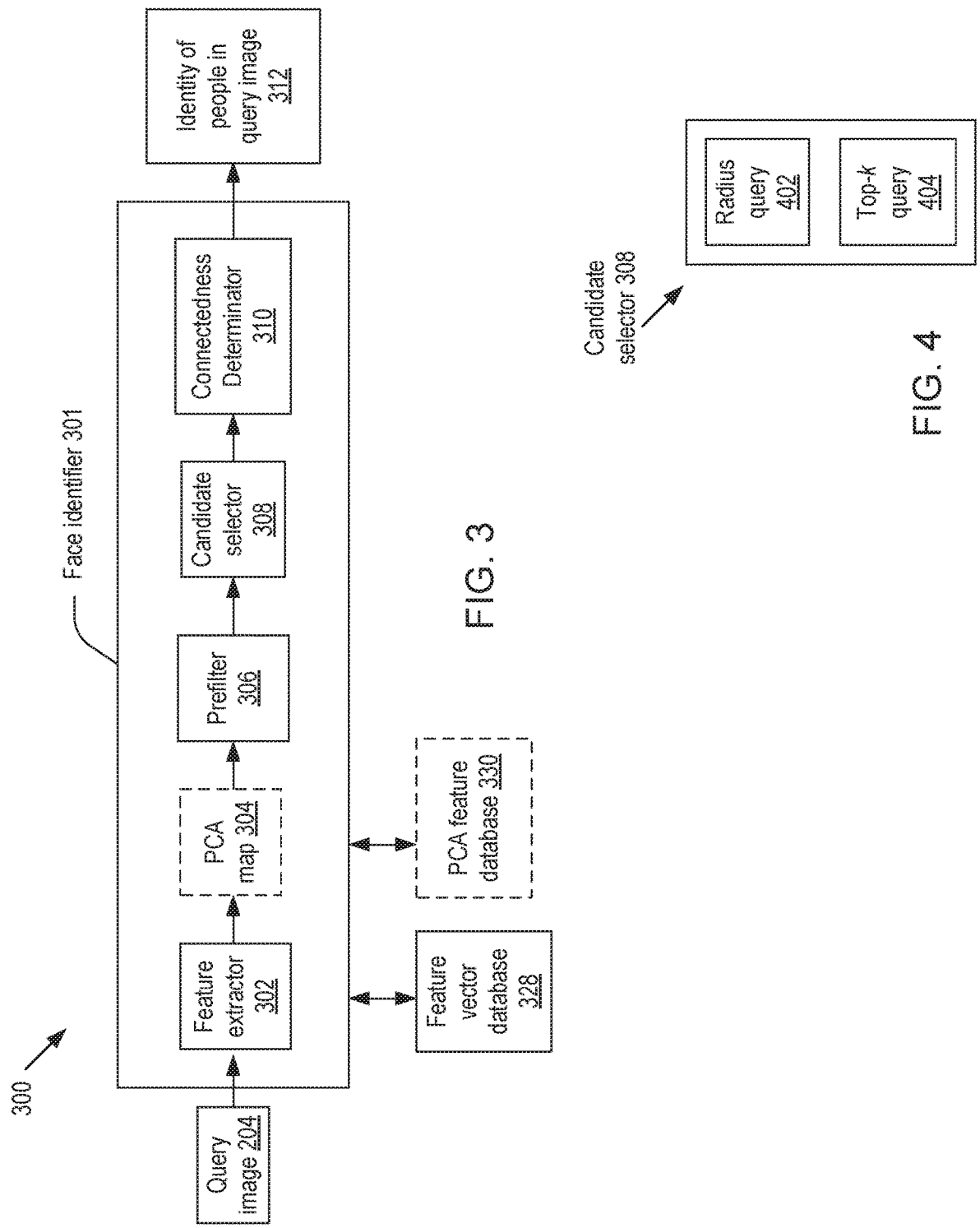

DETERMINING IDENTITIES OF MULTIPLE PEOPLE IN A DIGITAL IMAGE

A. TECHNICAL FIELD

The present disclosure relates to identifying multiple persons in a digital image, more particularly, to systems and methods for determining identities of two or more persons in a query image, such as a still image (photo) or a video image, by measuring the strength of connection between them in a network.

B. DESCRIPTION OF THE RELATED ART

With the advent of networking technologies, multiple databases have been created that contain information and images of individuals, such as human resources personnel databases, picture databases, social networking sites (SNS), social media sites, internet marketplaces, and the like. Such databases and technologies can be used to enable people to interact with each other via databases of personal profiles, such as through social networking sites (SNS) like Facebook® and Twitter®, social media sites like YouTube® and Tripadvisor®, and marketplaces like eBay® and Airbnb®. For instance, in certain of the aforementioned examples a member or user creates a personal profile, which may be posted on a virtual bulletin board. Each personal profile typically includes text and video/photos that are uploaded from the member's computer and/or phone. In general, a site has a database that stores the user profile data of the members and helps the members to find/communicate with their contacts, who are generally called "friends."

Most internet based services allow each user to create a profile. However, the information entered by users is usually unverified. This enables malicious users to easily create multiple fake identities for nefarious purposes such as spamming, defrauding or free-riding. It is valuable for an internet based service to identify real/honest users vs. fake/malicious users. If a service is able to determine the identity of a person in an image, it allows that service to, e.g., identify fake identities that may be using the same fake photo in their image, and identity real identities by comparing their profile images to images from other external databases.

Some approaches have thus been attempted to identify the member in a given query image in a first database by matching the facial image in the query image to an image stored in a second database, such as a second SNS. However, the conventional approaches frequently fail. For example, some existing methods do not work if the member did not upload an image of the member to the database. Also, even if the member uploaded the photo, the query image might have been taken at a different angle and/or environment than the photos in the database, significantly reducing the success rate of the identification process. Moreover, since a typical image database, such as an SNS database, includes a large number of members and each member posts multiple photos, the matching process may require an intractable amount of computational resources or time. In addition, it is not uncommon that a member (e.g., a user of a SNS) includes something other than a photo of themselves when creating their profile, such as using an image of a celebrity as their picture instead of a picture of themselves. Such cases are particularly problematic to existing approaches that employ straightforward photo matching. In such a case, the conventional approaches would not work properly since a large number of members may post photos of the celebrity on their profiles and matching would indicate that they are all the same users, when in fact, they are different users. There is a need for systems and methods for determining identities of multiple people in a query image with enhanced accuracy.

BRIEF DESCRIPTION OF THE DRAWINGS

References will be made to embodiments of the present disclosure, examples of which may be illustrated in the accompanying figures. These figures are intended to be illustrative, not limiting. Although the present disclosure is generally described in the context of these embodiments, it should be understood that it is not intended to limit the scope of the present disclosure to these particular embodiments.

FIG. 3 shows a functional block diagram of a face identifier according to embodiments of the present disclosure.

FIG. 4 shows exemplary candidate selectors according to embodiments of the present disclosure.

DETAILED DESCRIPTION OF THE EMBODIMENTS

In the following description, for purposes of explanation, specific details are set forth in order to provide an understanding of the present disclosure. It will be apparent, however, to one skilled in the art that the present disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or nodes, shown in diagrams are illustrative of exemplary embodiments of the disclosure and are meant to avoid obscuring the disclosure. It shall also be understood that throughout this discussion that components may be described as separate functional units, which may have sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between networks and clients within the figures are not intended to be limited to direct connections. It shall also be noted that the terms "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service or database is not limited to a single service or database; usage of these terms may refer to a grouping of related services or databases, which may be distributed or aggregated.

Figure 1:
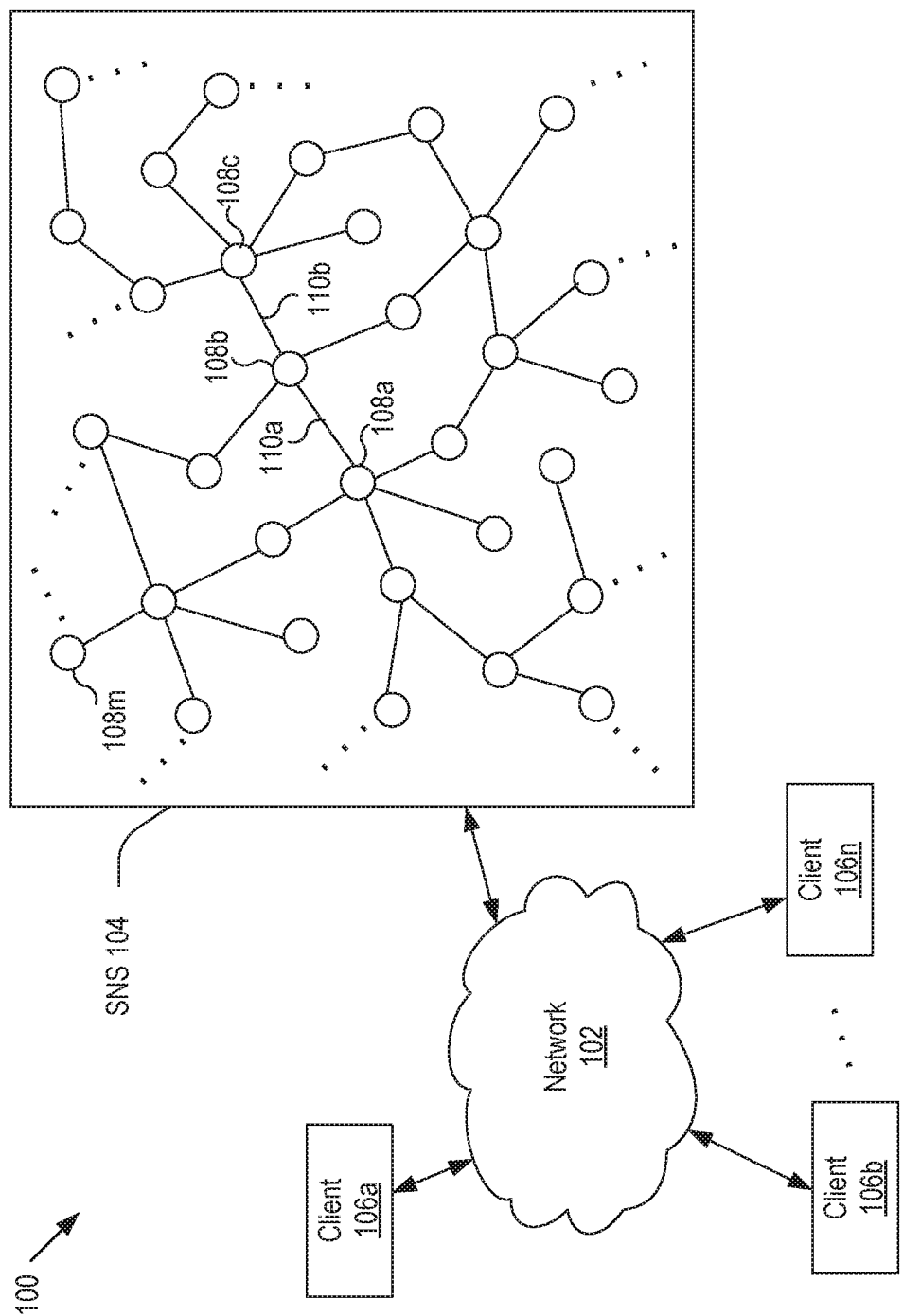
FIG. 1 shows a schematic diagram of a network environment according to embodiments of the present disclosure.

FIG. 1 shows a schematic diagram of a network environment 100 according to embodiments of the present disclosure. As depicted in FIG. 1, an image database 104 is connected to a network 102, such as the Internet. In the illustrated embodiment, the image database 104 is depicted as SNS database, although it should be apparent to those of ordinary skill in the art that the image database 104 may be any type of database that includes images (e.g., video or still images). It is also noted that the SNS 104 may include more than just images.

The users (or, equivalently members) may use the client devices 106a-106n (or, shortly clients) to create the user profiles, upload photos and video, and otherwise use the services of the site or service (such as, send messages, keep in touch with friends, engage services, etc.). Hereinafter, the term "user profile" refers to some or all data associated with a user, typically at least part of which is provided as part of establishing an account with an SNS or other service or site, that helps identify the user; such information may include unique identifiers, personal information, photos including a representative photo, videos, messages so on, some of which may have been created and uploaded to the user's account via one or more clients 106a-106n. Each of the clients 106a-106n may be a desktop computer, laptop computer, or mobile device that has a capability to communicate data with the SNS 104 via the network 102. The terms "photo" and "image" may be used interchangeably and refer to a digital image from which features are extracted. Also, the term "face" refers to a whole face or a partial face.

In embodiments, the SNS 104 may include one or more servers/computers and software programs that allow the users to communicate with each other. The SNS 104 may also include a database(s) for storing data of the user profiles. A user may create a user profile in more than one SNS and/or may create multiple user profiles in the same SNS. In embodiments, the SNS 104 may allocate a virtual bulletin board to each user so that the user can leave information, such as message, photos, and video, on the virtual bulletin board and the other members of the SNS 104 may access the information posted on the virtual bulletin board. In embodiments, an interactive feature may allow members to comment on the photos and identify (tag) people in the photos.

Figure 2:
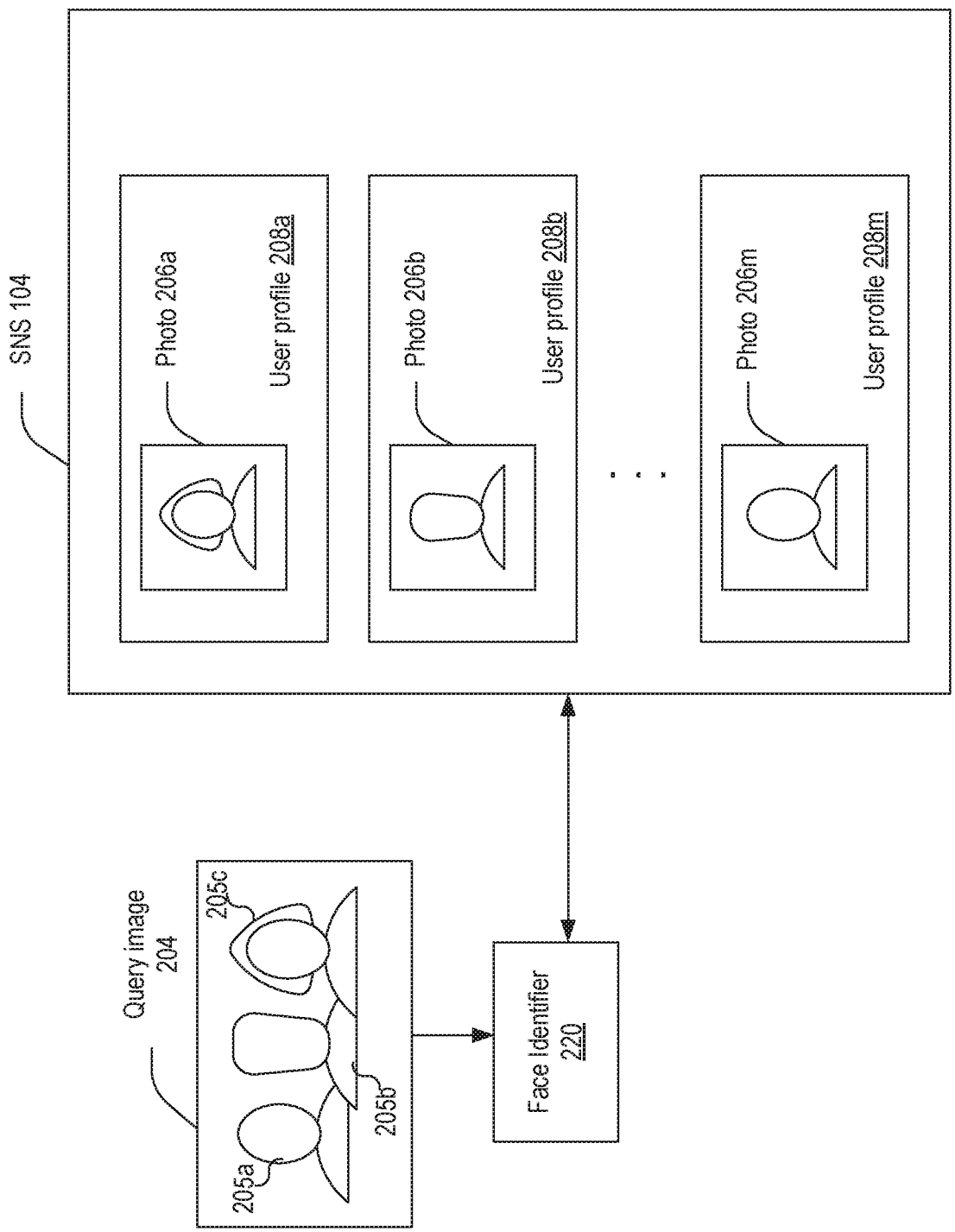
FIG. 2 shows a query image that includes face images of multiple persons according to embodiments of the present disclosure.

FIG. 2 shows a query image 204 that may be a group photo and include multiple face images 205a-205c of persons according to embodiments of the present disclosure. As depicted in FIG. 2, the SNS 104 may allow the users to create user profiles (or user accounts) 208a-208m and store the user profiles. In embodiments, one or more photos associated with user profiles (e.g., profiles 208a-208m) may be uploaded from a client (e.g., clients 106a-106n).

In embodiments, the face identifier 220 may identify each person in the query image 204 by comparing it against the photos 206a-206m in the SNS 104. In embodiments, the face identifier 220 may extract features of the query image and generate a feature vector that includes represents extracted features. Hereinafter, this feature vector may be referenced as an original feature vector. In embodiment, the length of the original feature vector may be 128 bytes, and each byte may correspond to a feature, although other vector sizes may be used. In embodiments, the distance between two feature vectors in the feature vector space represents a level of match between two faces corresponding to the two feature vectors, i.e., the closer the two feature vectors are in the vector space, the more likely the persons in the two photos are the same person.

In embodiments, each of the query image 204 and the images 206a-206m may be a still photo, a video, or a still frame taken from a video, and the face identifier 220 may identify each person in the query image by comparing the face image against the images 206a-206m in the SNS 104. In the following sections, for the purpose of illustration, the query image 204 and images 206a-206 are assumed to be photos/images. However, it should be apparent to those of ordinary skill in the art that the face identifier 220 may be used to identify a person in a photo or a still frame taken from a video.

For each face image (e.g. 205a), the face identifier 220 may compare the original feature vector of the face image 205a with the original feature vectors for the images 206a-206m. If one of the images 206a-206m (e.g., 206b) matches the face image 205a, the user profile associated with the face image 206b may be used to identify the person of the face image 205a. In embodiments, the face identifier 220 may find the match by selecting a photo that is closest to the face image 205a in the original feature vector space, although other classifications of matching may be used. This approach may be useful when the original feature vector of the photo 206b is very close to the original feature vector of the face image 205a in the feature vector space while the original feature vectors of other photos 206a and 206c-206m are far away from the original feature vector of the face image 205a.

The face identifier 220 may be applied to identify each person in the query image 204 by finding a match in a database in which the person in the query image and the identity of the associated individual have a high degree of accuracy/trustworthiness, such as a picture directory, a driver's license database, and the like. In such a case, each face in the query image may be identified with high precision since it is unlikely that there are going to be duplicates of a face in the database, because such databases are highly curated (e.g., it is unlikely that a single person will have multiple different drivers' licenses, etc.). However, the query image 204 may have been taken at a different angle and/or have a different size from the photo 206b, which may increase the possibility that the face identifier 220 misses the match. In other cases, it may be possible that the face in the query image 204 may be similar to one or more other people whose photos have been uploaded in the SNS 104. In such cases, a set of the original feature vectors may be are clustered, making it difficult to find a correct match. Also, each of the members of the SNS 104 may upload multiple photos, which may significantly increase the number of photos 206a-206m to be processed by the face identifier 220. To address such problems, in embodiments, the face identifier 220 may perform, as will be discussed below, one or more processes to help obtain a more discriminating match probability value.

FIG. 3 shows a functional block diagram 300 of a face identifier 301 according to embodiments of the present disclosure. As depicted, the face identifier 301 may include: a feature extractor 302 for extracting features from each face image; a principal component analysis (PCA) map 304 for reducing the dimension of extracted feature vectors; a prefilter 306, such as one or more k-d trees, for selecting a group of feature vectors from a large number of feature vectors (i.e., the filter helps reduce the search space); a candidate selector 308 for selecting candidate feature vectors among the group of feature vectors; and a connectedness determinator 310 for calculating the strength of connections between candidates feature vectors on the SNS 104 and selecting a set of vectors among the candidate feature vectors based on the calculated strength. Using the information of the user profiles 206a-206m that correspond to the selected set of candidate feature vectors, the identities 316 of the persons in the query image 204 may be determined.

In embodiments, the feature identifier 301 may be communicatively coupled to a database (e.g., an SNS), such as by the network 102, or included in the database. For a given query image 204 that includes face images to be identified, the feature extractor 302 extracts features of each face and generate an original feature vector for the face. In embodiments, OpenFace (presently available at: cmusatyalab.github.io/openface/), which is an open source face extraction library, may be used to obtain the original feature vector, although other feature extractors may be used. In embodiments, the length of the original feature vector may be 128 bytes, although other vector sizes may be used.

Because an image database may store huge numbers of images, possibly even billions of images, the length of the original feature vectors of the images may affect the amount of computational time and computer resources (e.g., data storage) for the identification process. Accordingly, in embodiments, the dimensions of the original feature vectors may be reduced by using principal component analysis (PCA). In embodiments, the PCA map 304 is used to reduce the dimensionality of the original feature vectors, thereby reducing storage requirements and computation resources, but does not significantly compromise robustness and accuracy in the matching process. In embodiments, the length of the original feature vector may be reduced to 32 bytes, i.e., only 32 features among 128 features may be selected and used in identifying the face. Hereinafter, the phrase "PCA feature vector" refers to vector output from a PCA map, such as PCA map 304, which has a dimensionality that is less than the dimensionality of the corresponding original feature vector. Also, the phrase "query feature vector" may, depending upon the embodiment, refer to an original feature vector or a PCA feature vector of a face image, such as the face image 205a, in the query image 204.

In embodiments, the feature extractor 302 may generate the original feature vectors of the photos 206a-206m and store the original feature vectors in the feature vector database 328. In embodiments, the PCA map 304 may transform the original feature vectors in the feature vector database 328 into PCA feature vectors and store the PCA feature vectors in a PCA feature database 330. In embodiments, the PCA feature database 330 may be an optional component. In embodiments, the PCA feature database 330 may be located in the SNS 104 or coupled/connected to the SNS 104 via the network 102.

In embodiments, the PCA map 304, which performs dimensionality reduction, may be trained in advance. The PCA map 304 is trained using a set of original feature vectors as input. Based on the input vectors, the PCA map can determine a dimensionality reduction of the original feature vector that does not significantly compromise the robustness in differentiating the original feature vectors from each other. That is, a tradeoff between the number of dimensions of the PCA feature vectors and the robustness in differentiating the original feature vectors from each other may be considered when setting a final PCA feature vector size.

Figure 12:
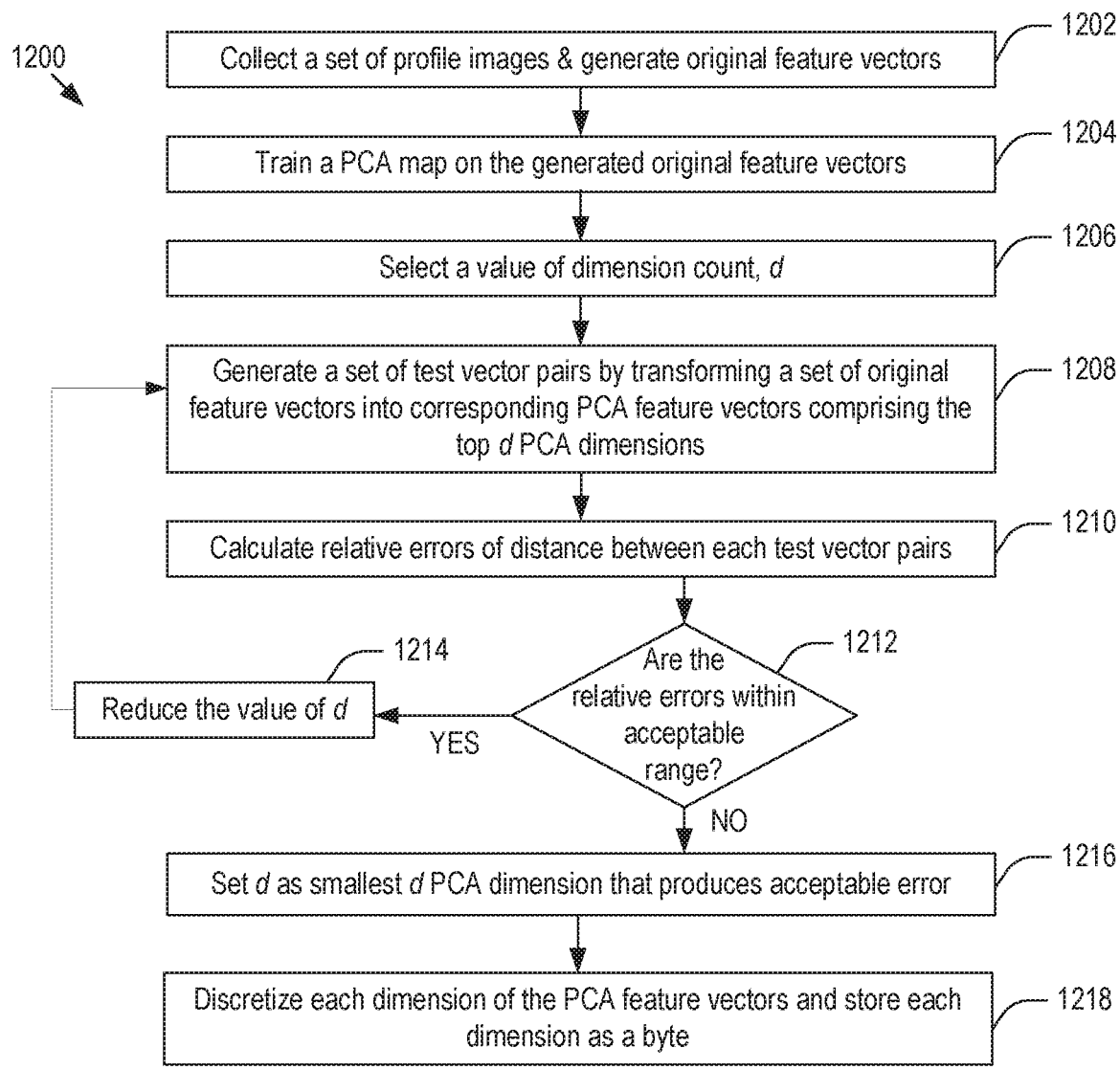
FIG. 12 shows a flowchart of an illustrative process for generating principal component analysis (PAC) feature vectors according to embodiments of the present disclosure.

FIG. 12 shows a flowchart 1200 of an illustrative process for generating a PCA feature vector according to embodiments of the present disclosure. At step 1202, a set of profile images may be collected or sampled. In embodiments, a subset of images (e.g., 80,000 images) may be selected from among a large number of images in the SNS 104, and a set of original feature vectors corresponding to the subset of images may be generated by the feature extractor 302.

At step 1204, a PCA map is trained using the set of original feature vectors. Then, in embodiments, a dimension count value, d, is selected (1206), where the dimension count d is less than or equal to the dimension of the original feature vectors. In embodiments, a set of test vector pairs are generated (1208) by transforming a set of original feature vectors into corresponding PCA feature vectors comprising the top d PCA dimensions, i.e., a set of the original feature vectors are transformed to their top d PCA dimensions. In embodiments, vectors pairs are formed (e.g., pairs of original feature vector and their corresponding PCA feature vector). In embodiments, for each test vector pair, a relative error may be determined (1210). For example, in embodiments, the relative error may be defined as:

$$\text{relative error} = |\text{true\_distance} - \text{est\_distance}| / \text{true\_distance}$$

where true_distance is the distance between the two original feature vectors and est_distance is the distance between corresponding two PCA feature vectors.

In embodiments, a check is made (1212) whether relative error is within an acceptable range. In embodiments, the acceptable range may be user defined and may be set such that at each test vector pair's relative error must be within an acceptable range, a cumulative value of multiple test vector pairs' relative errors (e.g., a mean, median, or mode) must be within an acceptable range, or some combination thereof. One skilled in the art shall recognize that a number of ways may be used for assessing acceptability (e.g., the maximum relative error, the relative error at the 95th percentile, etc.), and none of which is critical.

In embodiments, if the error is within an acceptable range, the value of the dimension count d may be reduced (1214) to examine whether even fewer features may be used to represent an image without significant loss in precision and recall. Then, in embodiments, steps 1208-1212 may be repeated until an unacceptable relative error level is observed.

In embodiments, when a dimensionality value, d, has been identified that produces an unacceptable level of error, the value of d may be set as the prior value (i.e., the smallest d value of PCA features that produced an acceptable error level at step (1216)).

In embodiments, all of the original feature vectors may be transformed in to PCA feature vectors using the top d PCA dimensions and stored in a PCA feature database 330.

In embodiments, the PCA feature vectors may be further reduced in size. For example, to save the storage space of the PCA feature database 330, each value of each component (or dimension) of the PCA feature vector may be discretized and stored as a byte so that each PCA feature vector in the PCA feature database 330 may be d-bytes long. For instance, if the dimension values of a dimension of a PCA feature vector has values that range between −0.8 and 0.8, then, the values may be linearly interpolated from [−1.0, 1.0] to the discrete range {0, 1, 2, . . . , 255} so that the dimension is represented as a single byte in step 1218.

In embodiments, the PCA feature database 330 may be located in the SNS 104 or coupled/connected to the SNS 104 via the network 102. When the PCA feature vectors of the face images 205a-205c are generated, the prefilter 306, such as k-d tree(s), may access the PCA feature database 330 and narrow down the search space. In embodiments, each of the k-d trees (short for k-dimensional tree) is a space-partitioning data structure for organizing points in a k-dimensional space, where k is an integer less than or equal to the dimension of the PCA feature vector.

Figure 5:
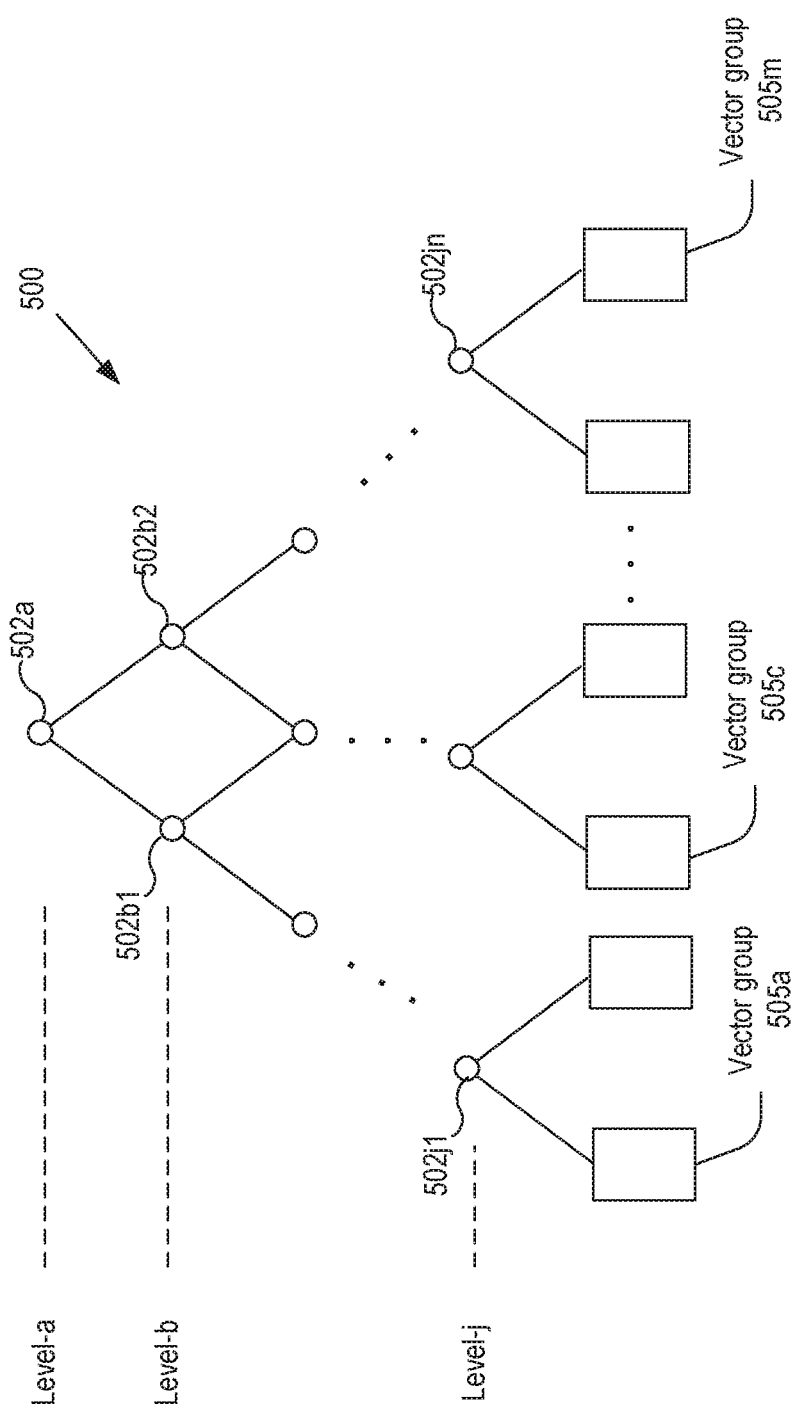
FIG. 5 shows a schematic diagram of a conventional k-dimensional tree (also referred to as a k-d tree) that may be used in embodiments of the present disclosure.

FIG. 5 shows a schematic diagram of a conventional k-d tree 500 that may be used in embodiments of the present disclosure. The k-d tree 500 is a useful data structure for searches involving a multidimensional search key and a special case of a binary space partitioning tree. As depicted, in embodiments, the k-d tree 500 may include multiple levels, level a-level j, and each level may include one or more nodes. For instance, the k-d tree 500 may include a root node 502a at level-a and leaf nodes 502j1-502jn at level-j. In embodiments, each node may be associated with a condition for one of the elements in the feature vector.

In embodiments, the k-d tree 500 may be generated before it is used to reduce the search space, i.e., the PCA feature vectors of the images 206a-206m may be added to the k-d tree 500 in advance. In embodiments, each PCA vector may be added by traversing the k-d tree 500: starting from the root node 502a and moving to either left or right at each child node until it reaches one of the vector groups 505a-505m. In embodiments, a library like FLANN (Fast Library for Approximate Nearest Neighbors) is used to train a set of k-d trees for answering nearest-neighbor queries.

In embodiments, the number of the k-d trees (and/or the number of nodes in each k-d tree) in the prefilter 306 may be a function of the size of the PCA feature database 330 and distribution of the PCA feature vectors in the database 330. In embodiments, the number of the k-d trees and the number of searches in each tree may be balanced so as to avoid going down to a wrong branch in the k-d trees and omitting the correct match. In embodiments, using the k-d trees that are prepared in advance, the face identifier 301 may select a vector group (e.g., 505c) that corresponds to a query feature vector, where the query vector refers to the PCA feature vector of a face image (e.g. 205a). In embodiments, the vectors in the selected vector group 505c may be selected as candidate feature vectors.

In embodiments, for a query feature vector, the vector group (e.g. 505c) selected by the prefilter 306 may still have a large number of vectors. In embodiments, the candidate selector 308 may select candidate feature vectors among the vectors in the vector group 505c. FIG. 4 shows exemplary types of the candidate selector 308 according to embodiments of the present disclosure. As depicted, the two types of queries, radius query 402 and top-k query 404, may be used as the candidate selector 308. In embodiments, the radius query 402 may get all the vectors that are within a preset radius from the query feature vector in the PCA feature vector space.

In embodiments, the top-k query 404 may score the vectors in the vector group (e.g. 505c) and select the top n vectors as candidate feature vectors, where n is a preset integer number. In embodiments, the score may indicate the probability of match between a candidate feature vector and the query feature vector. In embodiments, the score may be determined based on one of the PCA feature vector components that are not used in the nodes of the k-d tree 500. For example, the PCA feature vector may have thirty-two features (i.e., the PCA feature vector is a 32-dimensional vector) and the k-d tree in the prefilter 306 may use twenty components. Then, the top-k query 404 may score the vectors using three components of the remaining twelve features. The closer a vector is to the query feature vector in the 3-dimensional vector space, the higher score the vector may get.

In embodiment, the top result selected by the top-k query 404 may not be the right answer for several reasons: (1) the face matching process is inherently noisy and/or (2) to expedite the traversing process, the k-d tree query in the prefilter 306 is performed in an approximate mode instead of an exact mode. In the approximate mode, the k-d tree may ensure that the closest vector is among the candidate feature vectors, but may not guarantee that the closest vector is the top candidate feature vector.

Figure 6:
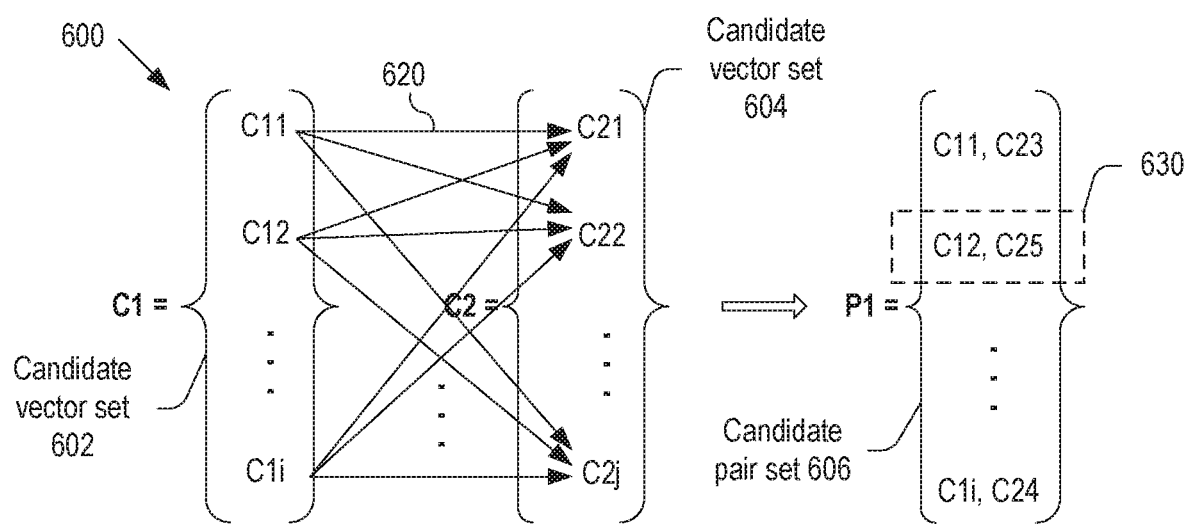
FIG. 6 shows a schematic diagram of determining strengths of connections between two sets of candidate feature vectors according to embodiments of the present disclosure.

In embodiments, using the candidate feature vectors of the face images 205a-205c in the query image 204, the connectedness determinator 310 may determine the strengths of connections between the candidate feature vectors and select the most densely connected pair of candidate feature vectors in the SNS 104. FIG. 6 shows a schematic diagram 600 for determining strengths of connections between two sets of candidate feature vectors (or, shortly candidate vector sets) C1 602 and C2 604 according to embodiments of the present disclosure. For the purpose of illustration, C1 602 is assumed to correspond to the face image 205a and include candidate feature vectors $C_{11}$, $C_{12}$ . . . , $C_{1i}$. Likewise, C2 602 is assumed to correspond to the face image 205b and include candidate feature vectors $C_{21}$, $C_{22}$ . . . , $C_{2j}$.

In embodiments, each vector in the candidate vector set C1 602 (or C2 604) may represent a node in the SNS 104 and each arrow (e.g. 620) in FIG. 6 represents the social connection from a person associated with a vector (e.g. $C_{11}$) in the candidate vector set C1 602 to a person associated with a vector (e.g. $C_{21}$) in the candidate vector set C2 604. In embodiments, for each arrow, the connectedness determinator 310 may calculate the strength of connection, where the strength of connection indicates how densely the person corresponding to a candidate feature vector of the candidate vector set C1 602 is connected to a person corresponding to a candidate feature vector in the candidate vector set C2 604 on the SNS 104.

In embodiments, the connectedness determinator 310 may use Personalize PageRank (PPR) or Maxflow algorithm, to calculate the strength of connection for each arrow. For instance, the PPR may start at a node (e.g. 108a) and take a large number of random walks from the node 108a in the SNS 104. Then, the probability that the random walks land on a specific node (e.g. 108m) represents the PPR score of the node 108a with respect to the specific node 108m. For each vector in the candidate vector set C1 602, one of the candidate feature vectors in the candidate vector set C2 604 may have the highest PPR score. For instance, C23 has the highest PPR score for $C_{11}$, $C_{25}$ has the highest PPR score for $C_{12}$, so on. In FIG. 6, the candidate pair set P1 606 may include the pairs of candidate feature vectors that have the highest PPR scores.

It is noted that PPR and Maxflow algorithms are two exemplary approaches to determine the strength of connection. One skilled in the art shall recognize that one or more of a number of other approaches may be used to gauge a strength of connection, including but not limited to: shortest path length between nodes, the number of unique paths between nodes, the approaches described in International PCT Publication No. WO 2015/191741 A1 and its US counterpart U.S. Pat. Appl. No. 62/010,393, each of which is incorporated by reference herein in its entirety.

In embodiments, the connectedness determinator 310 may select the pair that has the highest PPR score (or Maxflow score) among the candidate pair set P1 606 as the most densely connected vector pair.

Figure 7:
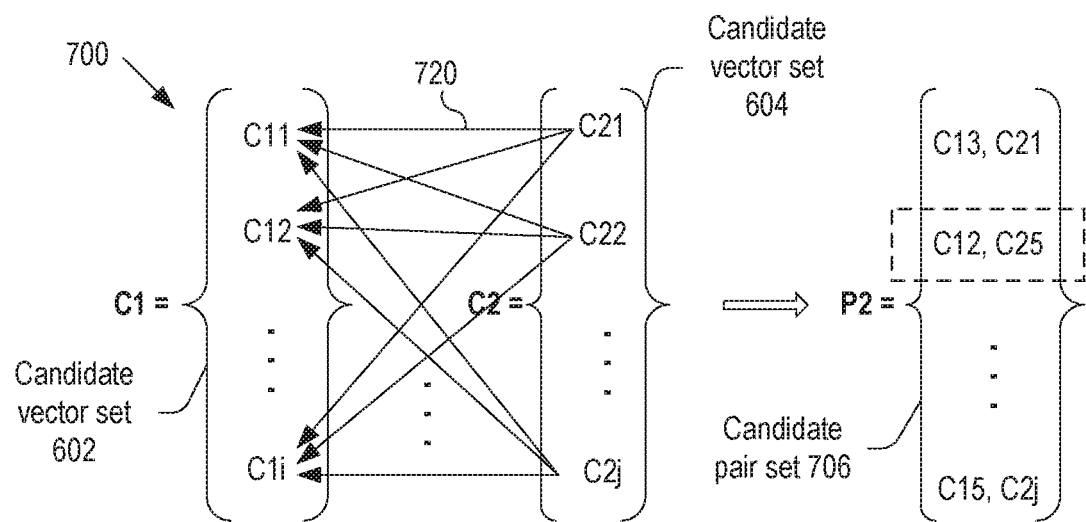
FIG. 7 shows a schematic diagram of determining strengths of connections between two sets of candidate feature vectors according to embodiments of the present disclosure.

FIG. 7 shows a schematic diagram 700 for determining the strengths of connections between two sets of candidate feature vectors, C1 602 and C2 604, according to embodiments of the present disclosure. In embodiments, the connectedness determinator 310 may use PPR or Maxflow algorithm to calculate the strengths of connections, and the candidate pair set P2 606 may include the pairs of candidate feature vectors that have the highest PPR scores.

Based on the candidate pair sets P1 606 and P2 706, the connectedness determinator 310 may select a pair of vectors that are most densely connected to each other. In embodiments, the connectedness determinator 310 may check if there is a pair that is included in both the candidate pair sets P1 606 and P2 706, i.e., the connectedness determinator may check if there is a pair of vectors that both have the highest PPR to each other. If such a pair exists, the pair is selected as the most densely connected vector pair since the two people corresponding to the vector pair are likely to be friends on the SNS 104 and there is a good possibility that they take a photo together. For the purpose of illustration, the vector pair ($C_{12}$, $C_{25}$) 630 is assumed to be present in both candidate pair sets P1 606 and P2 706 and thus, selected as the most densely connected vector pair. In embodiments, if such a pair does not exist, the pair that has the highest mutual score may be selected as the most densely connected vector pair. The mutual score may be the sum of connectedness-scores for a candidate vector pair (c1, c2), where c1 belongs to the candidate vector set C1 602 and c2 belongs to the candidate vector set C2 604. For instance, the mutual score of a pair ($C_{11}$, $C_{21}$) is the sum of the connectedness-score for $C_{11} \rightarrow C_{21}$ (as represented by an arrow 620) and the connectedness-score for $C_{21} \rightarrow C_{11}$ (as represented by an arrow 720).

In embodiments, for each candidate vector pair (c1, c2), where c1 belongs to the candidate vector set C1 602 and c2 belongs to the candidate vector set C2 604, the two scores of the vectors c1 and c2 calculated by the top-k query 404 may be added to the mutual score of the candidate vector pair (c1, c2). Then, this combined score may be used as the connectedness-score of the candidate vector pair (c1, c2), and the candidate vector pair having the highest combined score may be selected as the most densely connected vector pair.

Upon selecting the most densely connected vector pair, the user accounts (or user profiles) associated with the selected vector pair may be used to determine the identities 312 of the corresponding face images in the query image 204. In embodiments, the steps described in conjunction with FIGS. 6 and 7 may be repeated to identify the third face image in the query image 204. For instance, the face identifier 301 may select two face images (e.g., 205a and 205b) and identify the two people corresponding to the two face images. Then, the face identifier 301 may select other two face images (e.g., 205a and 205c) and identify the two people corresponding to the two face images.

Figure 8:
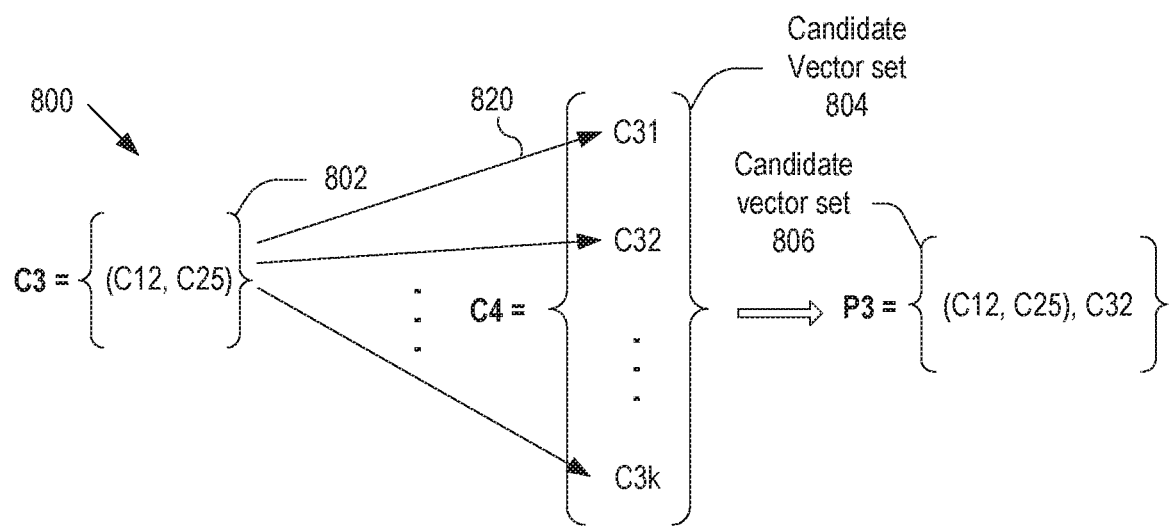
FIG. 8 shows a schematic diagram of determining strengths of connections between a pair of vectors and a set of candidate feature vectors according to embodiments of the present disclosure.

Alternatively, in embodiments, if the people corresponding to the two face images (e.g. 205a and 205b) are already identified, the other face image (e.g. 205c) in the query image 204 may be identified using the most densely connected vector pair of the face images 205a and 205b. For the purpose is illustration, ($C_{12}$, $C_{25}$) 630 is considered as the pair of vectors that has the highest connectedness-score for the two face images 205a and 205b. FIG. 8 shows a schematic diagram 800 for determining strengths of connections between a vector set C3 802 and candidate feature vectors in a candidate feature vector set (or shortly, candidate vector set) C4 804 according to embodiments of the present disclosure. The vector set C3 802 may include one pair of vectors that has the highest connectedness-score for the two face images 205a and 205b, where the vector set C3 802 may be determined by the process described in conjunction with FIGS. 6 and 7. The vector set C4 804 may be associated with the third face image 205c and generated by the components 302-308 of the face identifier 301 in FIG. 3.

In embodiments, for each arrow in FIG. 8, the strength of connection may be calculated, where the strength of connection indicates how densely the two people corresponding to the vector set C3 802 are connected to a person corresponding to a candidate feature vector in the vector set C4 804 on the SNS 104. In embodiments, the connected determinator 310 may use Personalize PageRank (PPR) or Maxflow algorithm to calculate the strength of connection. For instance, for the arrow 820, the PPR of the candidate feature vector Cu with respect to the candidate feature vector $C_{31}$ may be calculated using the SNS 104. Likewise, the PPR of the candidate feature vector $C_{25}$ with respect to the candidate feature vector $C_{31}$ may be calculated. Then, the sum of the two PPR scores may represent the strength of connection of the vector set 802 relative to the vector $C_{31}$. In FIG. 8, the candidate vector set P3 806 may include triple feature vectors that have the highest PPR score.

Figure 9:
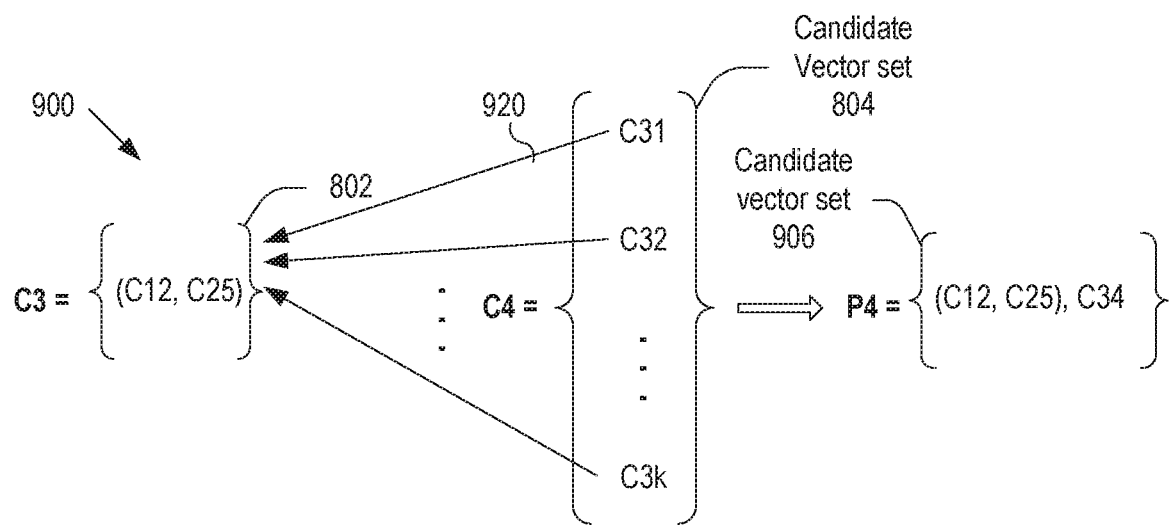
FIG. 9 shows a schematic diagram of determining strengths of connections between a set of candidate feature vectors and a pair of vectors according to embodiments of the present disclosure.

FIG. 9 shows a schematic diagram 900 for determining the strengths of connections between the candidate feature vectors in the candidate vector set C4 804 and a vector set C3 802 according to embodiments of the present disclosure. In embodiments, each arrow in FIG. 9 represents the social connection from a candidate feature vector in the vector set C4 804 to the vector set C3 802. The connectedness determinator 310 may use PPR or Maxflow algorithm to calculate the strength of connection for each arrow in FIG. 9 and the candidate vector set P4 906 may include triple feature vectors that have the highest PPR score.

Using the candidate vector sets P3 806 and P4 906, the connectedness determinator 310 may select a third vector that is most densely connected to the vector set 802. In embodiments, the connectedness determinator 310 may check if the candidate vector sets P3 806 and P4 906 have the same triple feature vectors. If such triple feature vectors exist, the triple feature vectors are selected as the most densely connected vectors since the three people corresponding to the triple feature vectors are likely to be mutual friends on the SNS 104 and there is a good possibility that they take a group photo. In the present example, there is no such set of vectors. In such a case, the triple feature vectors that have the highest mutual score may be selected as the most densely connected vector set. The mutual score may be the sum of connectedness-scores for a vector set (c3, c4), where c3 is the vector set C3 802 and c4 is one of the feature vectors in the candidate vector set C4 804. For instance, the mutual score of $\{(C_{12}, C_{25}), C_{31}\}$ is the sum of the connectedness-score of $(C_{12}, C_{25})$ relative to $C_{31}$ (as represented by the arrow 820) and the connectedness-score of $C_{31}$ relative to $(C_{12}, C_{25})$ (as represented by the arrow 920).

Upon selecting the most densely connected triple feature vectors, the user profile associated with the selected third candidate feature vector may be used to determine the identities 312 of the third face image 205c in the query image 204.

In embodiments, an approach having steps similar to those described in conjunction with FIGS. 8 and 9 may be repeated to identify other face images in the query image 204 if the query image 204 includes more than three face images. For instance, the connectedness determinator 310 may select a vector set $(C_{13}, C_{25}, C_{34})$ as the most densely connected vector set for the three face images in a query image. To identify the fourth face image in a query image, the connectedness-scores between the vector set $(C_{13}, C_{25}, C_{34})$ and a set of fourth candidate vectors associated with the fourth face image may be calculated according to steps similar to those described in FIGS. 8 and 9, i.e., the vector set $(C_{13}, C_{25}, C_{34})$ replaces the vector set 802 and the set of candidate feature vectors associated with the fourth face image replaces the set of candidate feature vectors 804 in FIGS. 8 and 9. Then, the connectedness determinator 310 may select one candidate feature vector among the fourth set of candidate feature vectors that has the highest connectedness-score with the vector set $(C_{13}, C_{25}, C_{34})$. In embodiments, the user profile associated with the selected fourth candidate feature vector may be used to identify the person associated with the fourth face image. This step may be repeated until all of the face images in the query image 204 are identified.

Figure 10A:
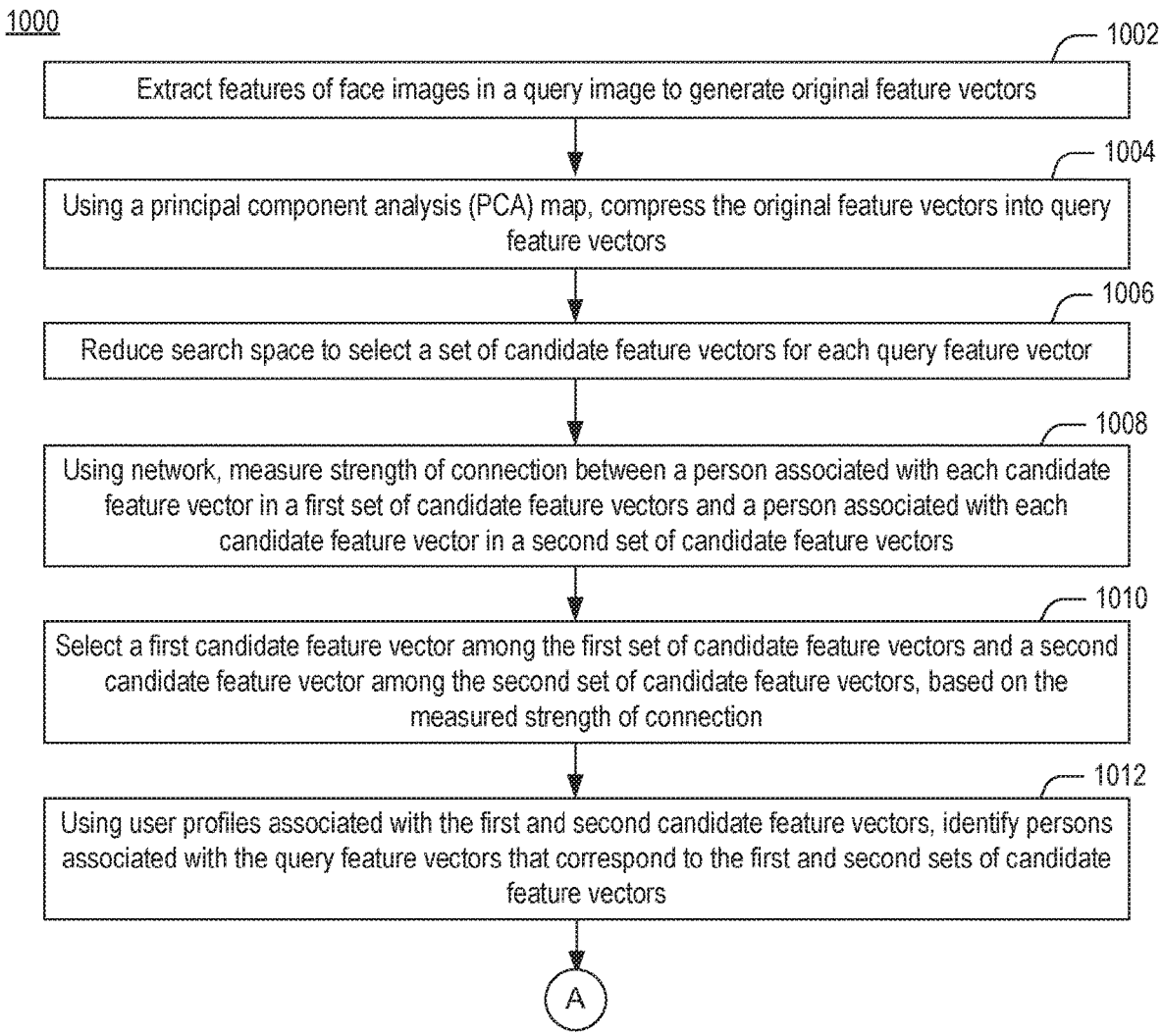
FIGS. 10A and 10B show a flowchart of an illustrative process for identifying persons in a query image according to embodiments of the present disclosure.
Figure 10B:
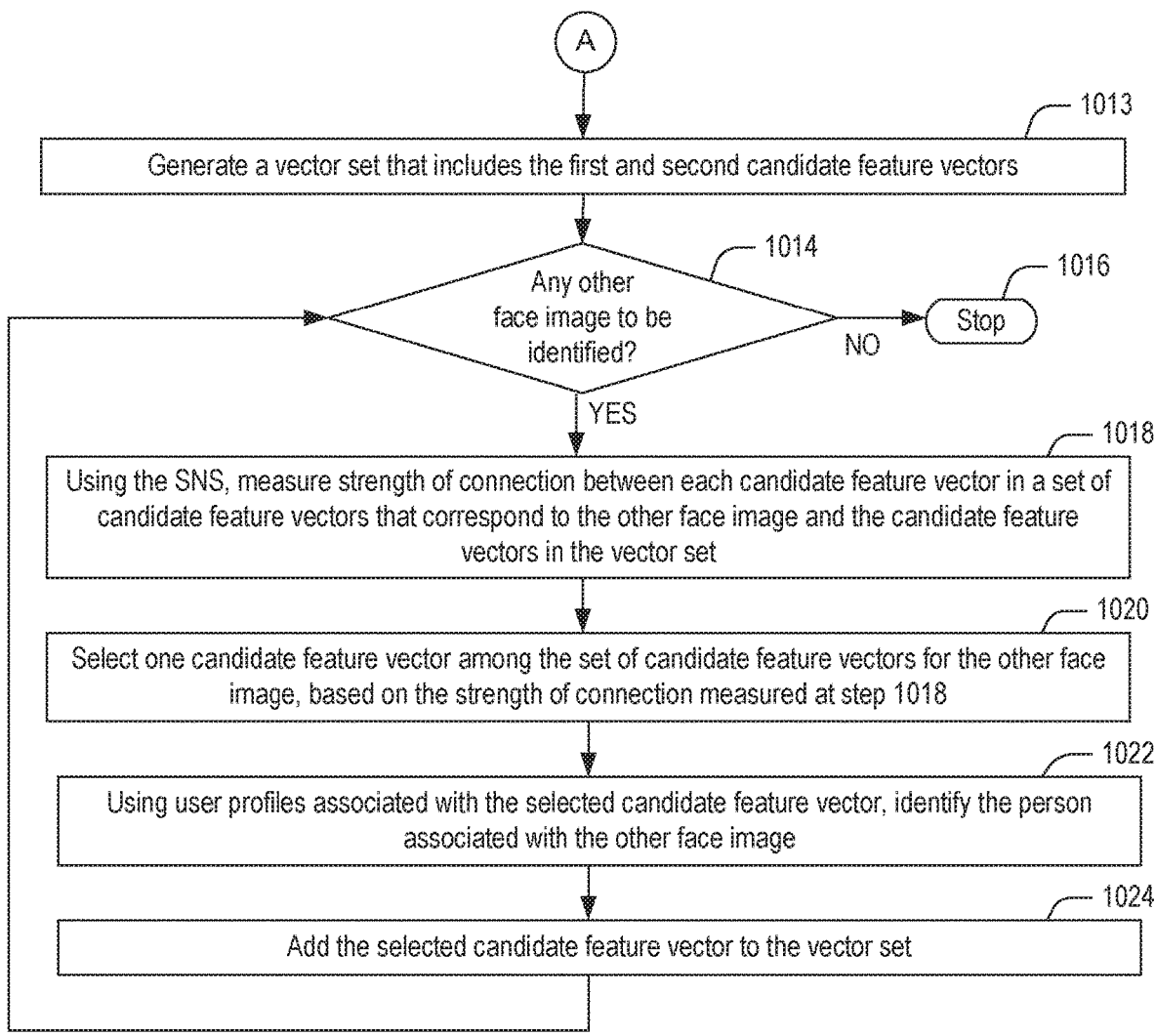

FIGS. 10A and 10B show a flowchart 1000 of an illustrative process for identifying persons in a query image according to embodiments of the present disclosure. At step 1002, the feature extractor 302 may extract features of multiple face images 205a-205c in the query image 204 to generate original feature vectors of the face images. Then, at step 1004, the dimension of the original feature vectors may be reduced by the PCA map 304 to thereby generate query feature vectors. In embodiments, the vectors generated by the PCA map 304, which are referred to as PCA feature vectors, have a dimension that is less than or equal to the original feature vectors inputted to the PCA map, thereby reducing storage requirements and computation resources, but not significantly compromising robustness and accuracy in the matching process. In embodiments, the step 1004 may be optional, i.e., the original feature vectors may be used in place of the PCA feature vectors to identify the persons in the query image. In embodiments, the PCA map 304 may be trained in advance, as described in conjunction with FIG. 12.

At step 1006, one or more k-d trees in the prefilter 306 may be used to narrow down the search space so that, for each query feature vector, a set of candidate feature vectors can be selected from a large number of PCA feature vectors stored in the PCA feature database 330.

At step 1008, using the SNS 104, the strength of connection between a person associated with each candidate feature vector in the first set of candidate feature vectors and a person associated with each candidate feature vector in the second set of candidate feature vectors may be measured. In embodiments, the connectedness determinator 310 may use Personalize PageRank (PPR) or Maxflow algorithm to measure the strength of connection on the SNS 104. Then, at step 1010, the connectedness determinator 310 may select a first candidate feature vector among the first set of candidate feature vectors and a second candidate feature vector among the second set of candidate feature vectors, based on the measured strength of connection. In embodiments, as described in conjunction with FIGS. 6 and 7, the two vectors in the vector set 602 may be selected as the most densely connected vectors on the SNS 104. At step 1012, using the user profiles associated with the first and second candidate feature vectors, the identities of the people associated with the first and second candidate feature vectors may be determined.

To identify the other face images in the query image 204, the process proceeds to step 1013. At step 1013, a vector set 802 that include the first and second candidate feature vectors may be generated. Next, it is determined whether there is any other face image to be identified in the query image 204 at step 1014. Upon negative answer to step 1014, the process stops at step 1016. Otherwise, the process proceeds to step 1018.

At step 1018, using the SNS 104, the strength of connection between each candidate feature vector in the set of candidate feature vectors that corresponds to the other face image and the vector set may be measured. Then, at step 1020, one candidate feature vector among the set of candidate feature vectors that correspond to the other face image may be selected, based on the strength of connection measured at step 1018. In embodiments, the candidate feature vector selected at step 1020 and the vector set are associated with people who are the most densely connected on the SNS 104. At step 1022, the identity of the person of the other face image may be determined using the user profile associated with the candidate feature vector that is selected among the set of candidate feature vectors for the other face image.

At step 1024, the candidate feature vector selected among the set of candidate feature vectors for the other face image may be added to the vector set and the process proceeds to step 1014. Then the steps 1018-1024 may be repeated until all of the face images in the query image 204 are identified.

Figure 11:
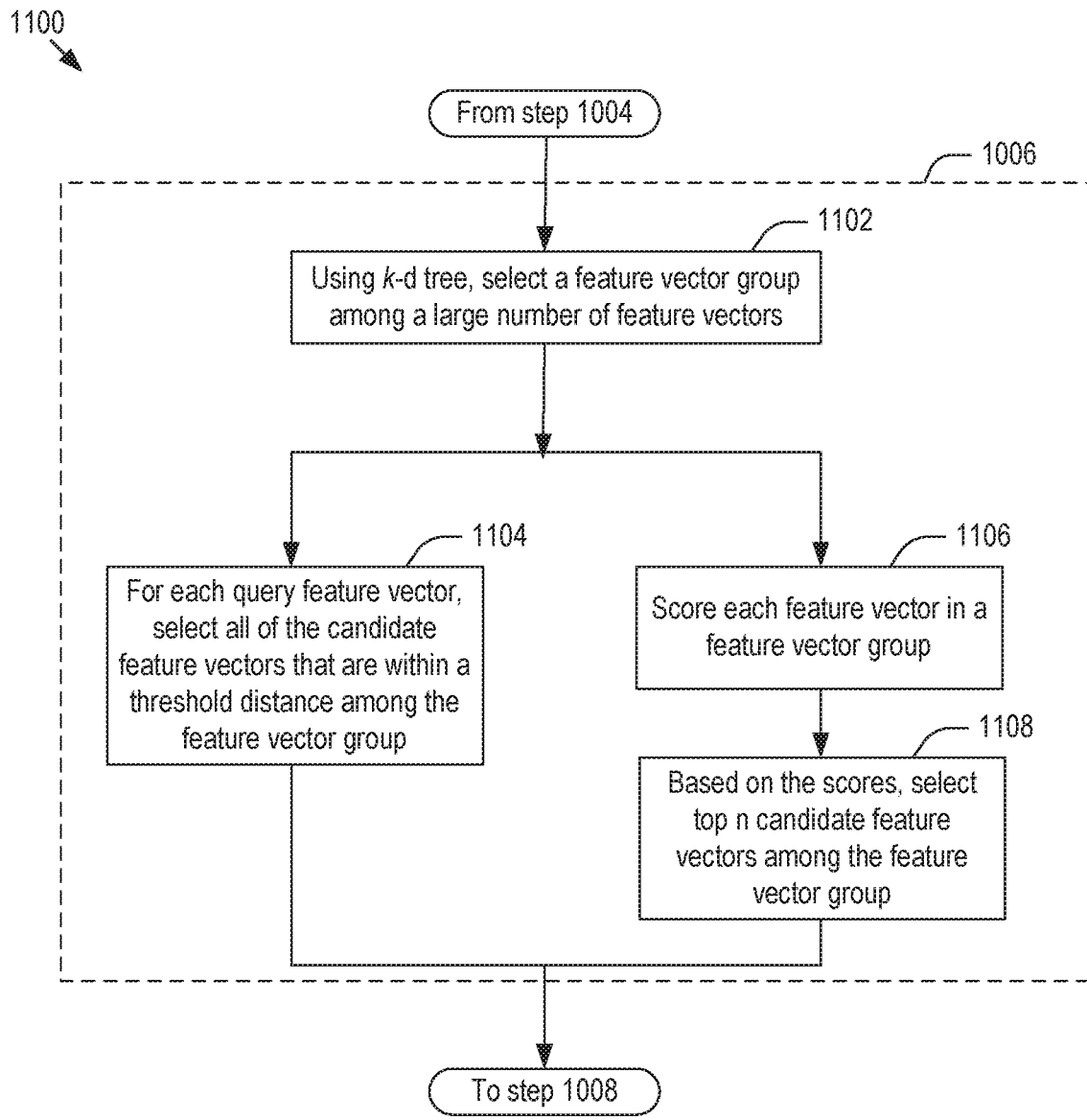
FIG. 11 shows a flowchart of an illustrative process for reducing search space according to embodiments of the present disclosure.

FIG. 11 shows a flowchart 1100 of an illustrative process for reducing search space 1006 according to embodiments of the present disclosure. At step 1102, one or more k-d trees in the prefilter 306 may be used to select a feature vector group (e.g. 505c) among a large number of feature vectors in the PCA feature database 330. Then, the process may proceed to either step 1104 or 1106. At step 1104, for each query feature vector, the radius query 402 may select all of the candidate feature vectors that are within a threshold distance from the query feature vector among the feature vector group. Then, the process proceeds to step 1008. At step 1106, the top-k query 404 may score each feature vector in the feature vector group. Then, at step 1108, the top-k query 404 may select top n candidate feature vectors among the feature vector group, where n is a positive integer. Then, the process proceeds to step 1008.

In embodiments, one or more computing system may be configured to perform one or more of the methods, functions, and/or operations presented herein. Systems that implement at least one or more of the methods, functions, and/or operations described herein may have an application or applications operating on at least one computing system. The computing system may have one or more computers and one or more databases. The computer system may be a single system, a distributed system, a cloud-based computer system, or a combination thereof.

It shall be noted that the present disclosure may be implemented in any instruction-execution/computing device or system capable of processing data, including, without limitation phones, laptop computers, desktop computers, and servers. The present disclosure may also be implemented into other computing devices and systems. Furthermore, aspects of the present disclosure may be implemented in a wide variety of ways including software (including firmware), hardware, or combinations thereof. For example, the functions to practice various aspects of the present disclosure may be performed by components that are implemented in a wide variety of ways including discrete logic components, one or more application specific integrated circuits (ASICs), and/or program-controlled processors. It shall be noted that the manner in which these items are implemented is not critical to the present disclosure.

Figure 13:
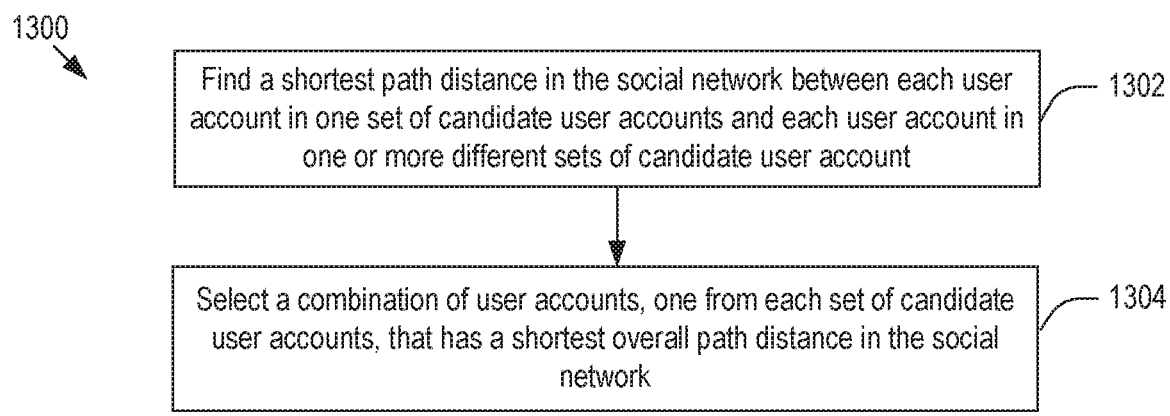
FIG. 13 shows a flowchart of an illustrative process for selecting a combination of user accounts that has the shortest overall path distance in the SNS according to embodiments of the present disclosure.

As describe in FIG. 6, two candidate vectors sets 602 and 604 may correspond to the face images 205a and 205b, respectively. Also, each vector in the candidate vector set C1 602 (or C2 604) may be associated with a user account (or a person who is represented as a node 108 in FIG. 1) in the SNS 104. FIG. 13 shows a flowchart 1300 of an illustrative process for selecting a combination of user profiles (or accounts) that has the shortest overall path distance in the SNS 104 according to embodiments of the present disclosure. At step 1302, the path distance in the SNS 104 between a user account associated with a vector (e.g. $C_{11}$) in the candidate vector set C1 602 to a user account associated with a vector (e.g. $C_{21}$) in the candidate vector set C2 604 may be determined. In embodiments, the path distance may be defined as the number of links 110 along the shortest path between two nodes that correspond to the candidate vectors (e.g. $C_{11}$ and $C_{21}$). At step 1304, the combination of user accounts that has the shortest path distance in the SNS 104 may be selected and used to identify the persons of the face images.

It is noted that the steps 1302 and 1304 may be used to identify more than two persons in the query image 204. For instance, the three candidate vectors sets C1 602, C2 604 and C4 804 (in FIG. 8) may correspond to the face images 205a, 205b and 205c, respectively. In embodiments, at step 1302, the overall path distance from a first candidate vector (e.g. $C_{11}$) to a third candidate vector (e.g. $C_{31}$) via a second candidate vector (e.g. $C_{21}$) may be determined. Then, at step 1304, the combination of three user accounts that has the shortest path distance may be selected and used to identify the three persons of the face images.

Figure 14:
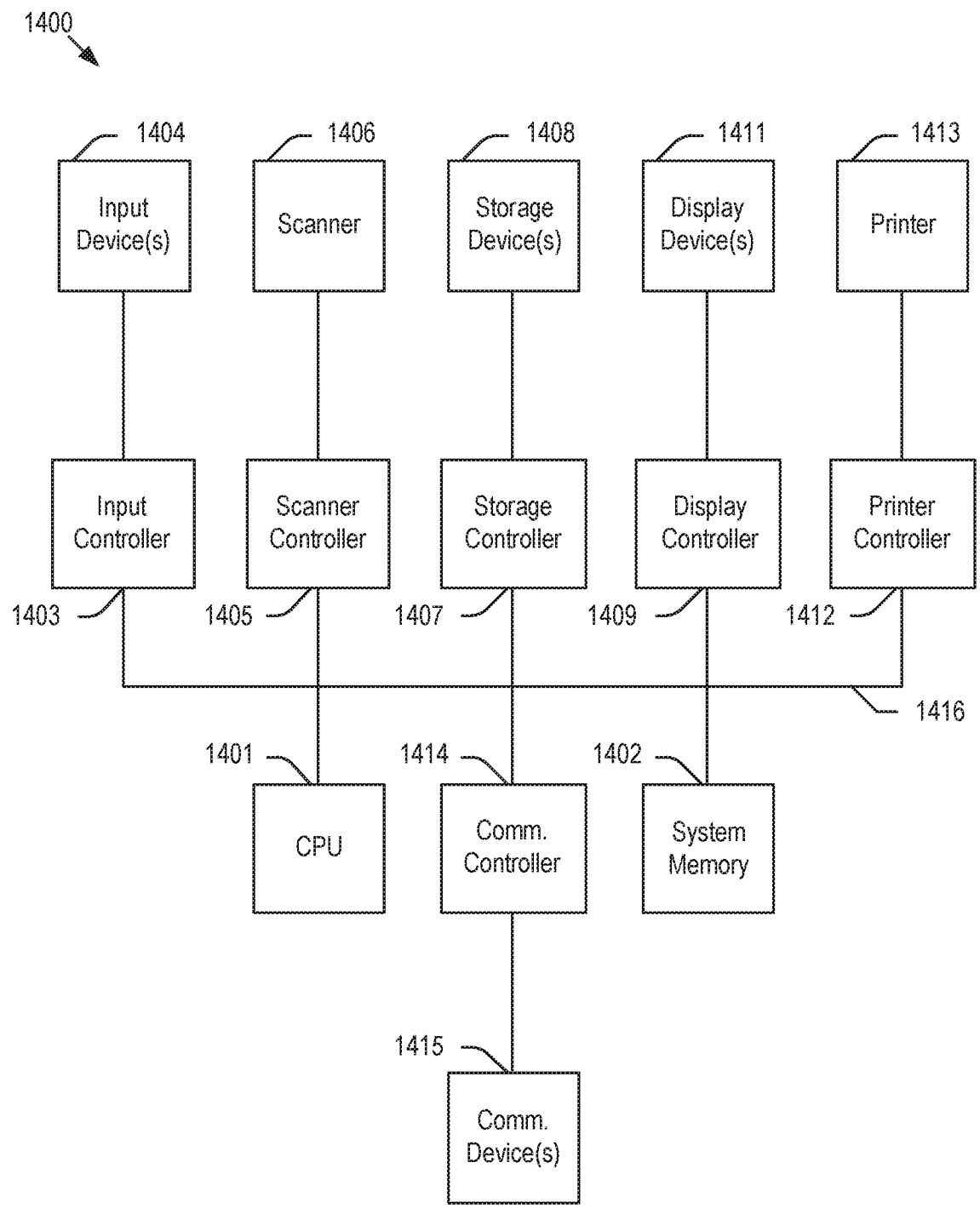
FIG. 14 shows a computer system according to embodiments of the present disclosure.

Having described the details of the disclosure, an exemplary system 1400, which may be used to implement one or more aspects of the present disclosure, will now be described with reference to FIG. 14. As illustrated in FIG. 14, system 1400 includes a central processing unit (CPU) 1401 that provides computing resources and controls the computer. CPU 1401 may be implemented with a microprocessor or the like, and may also include one or more graphics processor and/or floating point coprocessors for mathematical computations. System 1400 may also include a system memory 1402, which may be in the form of random-access memory (RAM) and/or read-only memory (ROM).

A number of controllers and peripheral devices may also be provided, as shown in FIG. 14. An input controller 1403 represents an interface to various input device(s) 1404, such as a keyboard, mouse, or stylus. There may also be a scanner controller 1405, which communicates with a scanner 1406. System 1400 may also include a storage controller 1407 for interfacing with one or more storage devices 1408 each of which includes a storage medium such as magnetic tape or disk, or an optical medium that might be used to record programs of instructions for operating systems, utilities and applications which may include embodiments of programs that implement various aspects of the present disclosure. Storage device(s) 1408 may also be used to store processed data or data to be processed in accordance with the present disclosure. System 1400 may also include a display controller 1409 for providing an interface to a display device 1411, which may be a cathode ray tube (CRT), a thin film transistor (TFT) display, or other type of display. System 1400 may also include a printer controller 1412 for communicating with a printer 1413. A communications controller 1414 may interface with one or more communication devices 1415, which enables system 1400 to connect to remote devices through any of a variety of networks including the Internet, an Ethernet cloud, a Fiber Channel over Ethernet (FCoE)/ Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of this disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims, below, may be arranged differently including having multiple dependencies, configurations, and combinations.

What is claimed is:

1. A method for identifying a plurality of persons in a group image having face images of each person of the plurality of persons, the method comprising:

generating, for each face image in the group image, a query feature vector that represents features extracted from the face image;

selecting, for each query feature vector, a set of candidate user accounts corresponding to the face image in the group image by comparing the query feature vector to at least some image feature vectors of a dataset of image feature vectors, each image feature vector in the dataset being associated with a user account of a network and the image feature vector being obtained from an image associated with the user account, and a set of candidate user accounts comprising a plurality of candidate user accounts;

measuring strengths of connection in the network between each candidate user account in a set of candidate user accounts corresponding to a face image in the group image and each candidate user account in a different set of candidate user accounts corresponding to a different face image in the group image;

for a face image in the group image, selecting a user account from the set of candidate user accounts corresponding to that face image based on at least one of the measured strengths of connection; and using the selected user account to identify the person for that face image in the group image.

2. The method of claim 1, wherein the step of generating a query feature vector comprises:

generating an original feature vector that includes one or more features extracted from a face image; and converting the original feature vector into the query feature vector by reducing a dimension of the original feature vector.

3. The method of claim 1, wherein the step of selecting, for each query feature vector, a set of candidate user accounts corresponding to the face image in the group image by comparing the query feature vector to at least some image feature vectors of a dataset of image feature vectors further comprises:

reducing a search space of the image feature vectors in the dataset.

4. The method of claim 3, wherein the step of selecting, for each query feature vector, a set of candidate user accounts corresponding to the face image in the group image by comparing the query feature vector to at least some image feature vectors of a dataset of image feature vectors comprises performing at least one of the steps comprising:

identifying a set of image feature vectors that are within a threshold distance of the query feature vector; and identifying as a set of image feature vectors a preselected number of image feature vectors that are closest to the query feature vector.

5. The method of claim 1, wherein the step of measuring strengths of connection comprises performing at least one of the steps comprising:

measuring a Personalize PageRank (PPR) score between a user account in one set of candidate user accounts and a different user account in a different set of candidate user accounts; and measuring a Maxflow score between a user account in one set of candidate user accounts and a different user account in a different set of candidate user accounts.

6. The method of claim 1, wherein the steps of measuring strengths of connection in the network between each candidate user account in a set of candidate user accounts and each candidate user account in a different set of candidate user accounts; and for a face image in the group image, selecting a user account from the set of candidate user accounts corresponding to that face image based on at least one of the measured strengths of connection, comprises:

finding a shortest path distance in the network between each user account in one set of candidate user accounts and each user account in one or more different sets of candidate user accounts; and selecting a combination of user accounts, one from each set of candidate user accounts, that has a shortest overall path distance in the network.

7. The method of claim 1, wherein the step of selecting a user account from the set of candidate user accounts corresponding to that face image based on at least one of the measured strengths of connection comprises:

selecting a first user account from a first set of candidate user accounts and a second user account from a second set of candidate user account wherein the first user account and the second user account have a highest strength of connection score among strength of connection scores between candidate user accounts in the first set of candidate user accounts and user accounts in the second set of candidate user accounts.

8. The method of claim 6, wherein the highest strength of connection score represents a highest combined strength of connection scores comprising a strength of connection score of a first candidate user account from the first set of candidate user accounts relative to a second user account from the second set of candidate user accounts combined with a strength of connection score of the second candidate user account from the second set of candidate user accounts relative to the first user account from the first set of candidate user accounts.

9. The method of claim 6, further comprising:
(a) adding the first and second user accounts to an identified set of user accounts;
(b) measuring strengths of connection in the network between user accounts in the identified set and another set of candidate user accounts corresponding to a another face image in the group image;
(c) for the another face image in the group image, selecting a user account from the another set of candidate user accounts based on at least one of the measured strengths of connection;
(d) responsive determining that there is yet another face image to be identified in the group image, adding the user account selected in step (c) to the identified set of user accounts and returning to step (b); and
(e) responsive determining that there are no other face images to be identified in the group image, using the identified set of user accounts to identify the person for each face image in the group image.

10. A method for identifying a plurality of persons in a group image having face images of the plurality of persons, comprising:

generating a query feature vector for each face image in a group image, the query feature vector representing features extracted from the face image;

selecting, for each query feature vector, a set of candidate feature vectors comprising a plurality of candidate feature vectors by comparing the query feature vector to at least some image feature vectors of a dataset of image feature vectors, each image feature vector in the dataset being associated with a user account of a network;

measuring strengths of connection in the network between each user account associated with candidate feature vectors in a first set of candidate feature vectors and each user account associated with candidate feature vectors in a second set of candidate feature vectors, the first and second sets of candidate feature vectors corresponding to first and second face images, respectively, in the group image;

selecting a first user account corresponding to a candidate feature vector in the first set of candidate feature vectors and a second user account corresponding to a candidate feature vector in the second set of candidate feature vectors based on at least one of the measured strengths of connection between the first and second user accounts; and using the first user account to identify a person in the first face image in the group image and using the second user account to identify a person in the second face image in the group image.

11. The method of claim 10, wherein the step of measuring strengths of connection comprises performing at least one of the steps comprising:

measuring a Personalize PageRank (PPR) score between a user account associated with a candidate feature vector in the first set of candidate feature vectors and a user account associated with a candidate feature vector in the second set of candidate feature vectors; and measuring a Maxflow score between a user account associated with a candidate feature vector in the first set of candidate feature vectors and a user account associated with a candidate feature vector in the second set of candidate feature vectors.

12. The method of claim 10, wherein the first user account has a highest strength of connection to the second user account among user accounts associated with the second set of candidate feature vectors.

13. The method of claim 10, wherein the first and second user accounts have a highest combined strength of connection score among all pairs of user accounts that includes a user account associated with a candidate feature vector from the first set of candidate feature vectors and a user account associated with a candidate feature vector from the second set of candidate feature vectors and wherein the combined score comprising a combination of a first strength of connection of the first user account relative to the second user account and a second strength of connection of the second user account relative to the first user account.

14. The method of claim 10, further comprising:
(a) adding the first and second user accounts to an identified set of user accounts;
(b) measuring strengths of connection in the network between user accounts in the identified set and another set of candidate user accounts corresponding to a another face image in the group image;
(c) for the another face image in the group image, selecting a user account from the another set of candidate user accounts based on at least one of the measured strengths of connection;
(d) responsive determining that there is yet another face image to be identified in the group image, adding the user account selected in step (c) to the identified set of user accounts and returning to step (b); and
(e) responsive determining that there are no other face images to be identified in the group image, using the identified set of user accounts to identify the person for each face image in the group image.

15. The method of claim 10, wherein the steps of measuring strengths of connection in the network comprises:

finding a shortest path distance in the network between each user account corresponding to a set of candidate feature vectors with each user account corresponding to a different set of candidate feature; and selecting a combination of user accounts, one for each set of candidate feature vectors, that has a shortest overall path distance in the network.

16. A system comprising:
one or more processors communicatively coupled to a dataset comprising image feature vectors, each image feature vector in the dataset being associated with a user account of a network; and
a non-transitory computer-readable medium or media comprising one or more sequences of instructions which, when executed by at least one of the one or more processors, causes steps to be performed comprising:
generating, for each face image in a group image, a query feature vector that represents features extracted from the face image;
selecting, for each query feature vector, a set of candidate user accounts corresponding to the face image in the group image by comparing the query feature vector to at least some image feature vectors of the dataset of image feature vectors, wherein a set of candidate user accounts comprises a plurality of candidate user accounts;
measuring strengths of connection in the network between each candidate user account in a set of candidate user accounts corresponding to a face image in the group image and each candidate user account in a different set of candidate user accounts corresponding to a different face image in the group image;
for a face image in the group image, selecting a user account from the set of candidate user accounts corresponding to that face image based on at least one of the measured strengths of connection; and
using the selected user account to identify the person for that face image in the group image.

17. The system of claim 16, wherein the step of measuring strengths of connection comprises performing at least one of the steps comprising:
measuring a Personalize PageRank (PPR) score between a user account in one set of candidate user accounts and a different user account in a different set of candidate user accounts; and
measuring a Maxflow score between a user account in one set of candidate user accounts and a different user account in a different set of candidate user accounts.

18. The system of claim 16, wherein the steps of measuring strengths of connection in the network between each candidate user account in a set of candidate user accounts and each candidate user account in a different set of candidate user accounts; and for a face image in the group image, selecting a user account from the set of candidate user accounts corresponding to that face image based on at least one of the measured strengths of connection, comprises:
finding a shortest path distance in the network between each user account in one set of candidate user accounts and each user account in one or more different sets of candidate user accounts; and
selecting a combination of user accounts, one from each set of candidate user accounts, that has a shortest overall path distance in the network.

19. The system of claim 16, wherein the step of selecting a user account from the set of candidate user accounts corresponding to that face image based on at least one of the measured strengths of connection comprises:
selecting a first user account from a first set of candidate user accounts and a second user account from a second set of candidate user account wherein the first user account and the second user account have a highest strength of connection score among strength of connection scores between candidate user accounts in the first set of candidate user accounts and user accounts in the second set of candidate user accounts.

20. The system of claim 16, wherein the non-transitory computer-readable medium or media comprising one or more sequences of instructions which, when executed by at least one of the one or more processors, causes steps to be performed comprising:
(a) adding the first and second user accounts to an identified set of user accounts;
(b) measuring strengths of connection in the network between user accounts in the identified set and another set of candidate user accounts corresponding to a another face image in the group image;
(c) for the another face image in the group image, selecting a user account from the another set of candidate user accounts based on at least one of the measured strengths of connection;
(d) responsive determining that there is yet another face image to be identified in the group image, adding the user account selected in step (c) to the identified set of user accounts and returning to step (b); and
(e) responsive determining that there are no other face images to be identified in the group image, using the identified set of user accounts to identify the person for each face image in the group image.

\* \* \* \* \*